US008847929B2

(12) United States Patent
Yamazoe

(10) Patent No.: US 8,847,929 B2
(45) Date of Patent: Sep. 30, 2014

(54) INFORMATION PROCESSING APPARATUS, INFORMATION PROCESSING METHOD, AND COMPUTER READABLE MEDIUM STORING PROGRAM

(75) Inventor: Nobuyuki Yamazoe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 256 days.

(21) Appl. No.: 12/947,557

(22) Filed: Nov. 16, 2010

(65) Prior Publication Data

US 2011/0279389 A1 Nov. 17, 2011

(30) Foreign Application Priority Data

May 14, 2010 (JP) ................................. 2010-112659

(51) Int. Cl.
*G06F 3/033* (2013.01)
(52) U.S. Cl.
USPC .......................................... 345/179; 345/173
(58) Field of Classification Search
USPC .................................................. 345/173–179
See application file for complete search history.

(56) References Cited

U.S. PATENT DOCUMENTS

| 5,502,803 | A | * | 3/1996 | Yoshida et al. | ................ | 715/201 |
| 5,861,886 | A | | 1/1999 | Moran | | |
| 6,233,464 | B1 | * | 5/2001 | Chmaytelli | ................ | 455/556.2 |
| 2003/0025681 | A1 | | 2/2003 | Hara | | |
| 2006/0125799 | A1 | * | 6/2006 | Hillis et al. | ................ | 345/173 |
| 2008/0192013 | A1 | * | 8/2008 | Barrus et al. | ................ | 345/173 |
| 2010/0141589 | A1 | * | 6/2010 | Hoover | ................ | 345/173 |

OTHER PUBLICATIONS

"Cyber Conference System, Standalone Version SV," Pioneer Corp., URL: http://pioneer.jp/ccs/catalog/pdf/ccs/CCS-SV.pdf, 2007, 2 pages.

* cited by examiner

*Primary Examiner* — Robin Mishler
(74) *Attorney, Agent, or Firm* — Sughrue Mion, PLLC

(57) ABSTRACT

An information processing apparatus includes a first display controller that causes a screen to display a first image, a second display controller that causes the screen to display a second image, a trail obtaining unit that obtains a trail, a status obtaining unit that obtains a status of an operation member, a first update unit that updates the first image, an image obtaining unit that obtains a screen image, a first switching controller that performs, if a trail is obtained, control to switch the display on the screen to display of the second image, a second update unit that updates, if a trail is obtained, the second image to an image obtained by drawing a trail image, a second switching controller that performs control to switch the display on the screen to display of the first image, and a unit that causes a memory to store the second image.

4 Claims, 8 Drawing Sheets

| CONDITION | TRAIL CONDITION |
|---|---|
| DATA FORMAT OF DOCUMENT P IS DATA FORMAT X (CONDITION A) | TRAIL CONDITION A |
| DATA FORMAT OF DOCUMENT P IS DATA FORMAT Y (CONDITION B) | TRAIL CONDITION B |
| DATA FORMAT OF DOCUMENT P IS DATA FORMAT Z (CONDITION C) | TRAIL CONDITION C |
| DATA FORMAT OF DOCUMENT P IS DATA FORMAT W (CONDITION D) | TRAIL CONDITION D |

INFORMATION PROCESSING APPARATUS, INFORMATION PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-112659 filed May 14, 2010.

BACKGROUND (i) Technical Field

The present invention relates to an information processing apparatus, an information processing method, and a computer readable medium storing a program.

SUMMARY

According to an aspect of the invention, there is provided an information processing apparatus including a first display controller that causes a screen to display a first image, a second display controller that causes the screen to display a second image, a trail obtaining unit that obtains a trail input onto the screen by a user, a status obtaining unit that obtains information showing a status of an operation member that is operated by the user to input a trail onto the screen, a first update unit that updates the first image displayed on the screen when the first display controller is causing the first image to be displayed, an image obtaining unit that obtains a screen image, which is an image displayed on the screen, if a trail is obtained by the trail obtaining unit when the first display controller is causing the first image to be displayed, a first switching controller that performs, if a trail is obtained by the trail obtaining unit when the first display controller is causing the first image to be displayed, control to switch the display on the screen to display of the second image controlled by the second display controller, the second image being an image obtained by drawing a trail image representing the trail on the screen image, a second update unit that updates, if a trail is obtained by the trail obtaining unit when the second display controller is causing the second image to be displayed, the second image to an image obtained by drawing a trail image representing the trail on the second image, a second switching controller that performs, if a given operation is performed when the second display controller is causing the second image to be displayed, control to switch the display on the screen to display of the first image controlled by the first display controller, and a unit that causes a memory to store the second image if the given operation is performed when the second display controller is causing the second image to be displayed. The image obtaining unit obtains the screen image if a status shown by the information obtained by the status obtaining unit is a certain reference status when a trail is obtained by the trail obtaining unit. The second switching controller causes the second display controller to cause the second image to be displayed if a status shown by the information obtained by the status obtaining unit is the reference status when a trail is obtained by the trail obtaining unit.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the invention will be described in detail with reference to the drawings.

Figure 1:
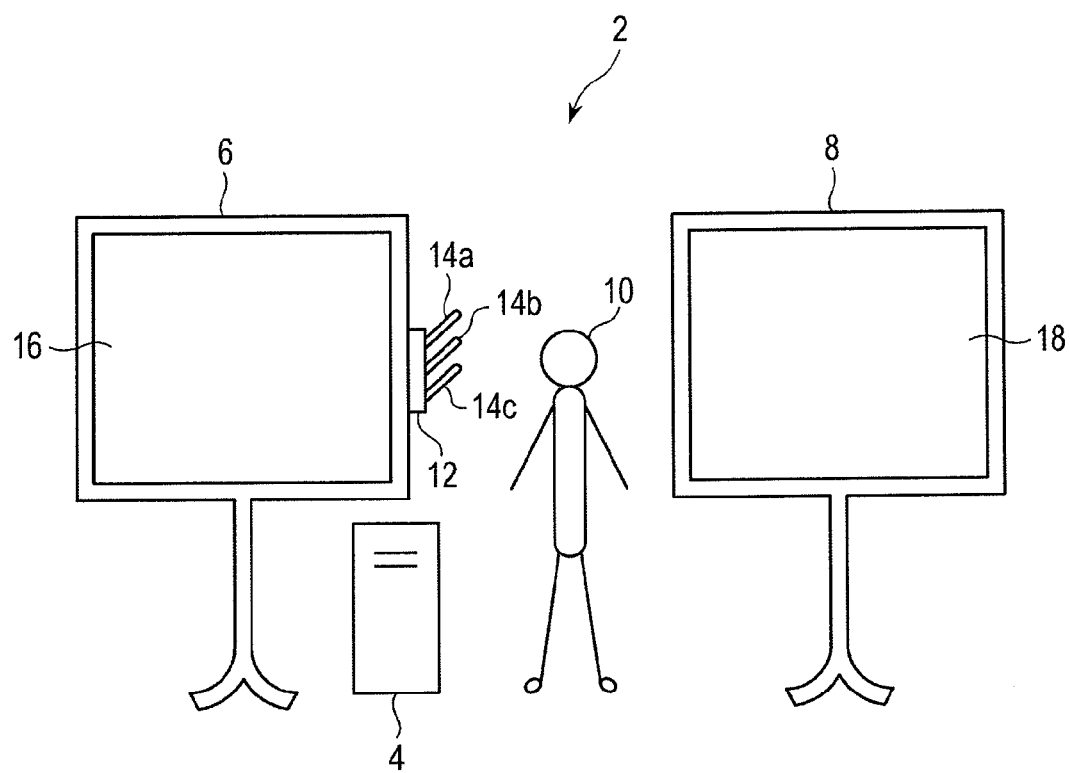
FIG. 1 is a diagram illustrating an example of a conference system.

FIG. 1 is a diagram illustrating an example of a conference system 2. The conference system 2 is installed in a conference room, for example. As illustrated in FIG. 1, the conference system 2 includes an information processing apparatus 4, a first display 6, and a second display 8. The information processing apparatus 4 is connected to the first display 6 and the second display 8 such that data may be transmitted/received therebetween. A user 10 is a presenter who performs a presentation in a conference.

The first display 6 is provided with a pen tray 12. The pen tray 12 accommodates three electronic pens 14a, 14b, and 14c. The pen tray 12 includes a pressure-sensitive sensor, which detects whether each electronic pen is accommodated in the pen tray 12.

Hereinafter, the electronic pen 14a is referred to as a black pen 14a, the electronic pen 14b is referred to as a red pen 14b, and the electronic pen 14c is referred to as an eraser pen 14c. Also, the electronic pens 14a, 14b, and 14c may be collectively referred to as electronic pens 14.

The first display 6 is also provided with a touch panel. A position on a first screen 16 pressed by the user 10 is detected by the touch panel.

The second display 8 is provided with a touch panel. A position on a second screen 18 pressed by the user 10 is detected by the touch panel.

Figure 2:
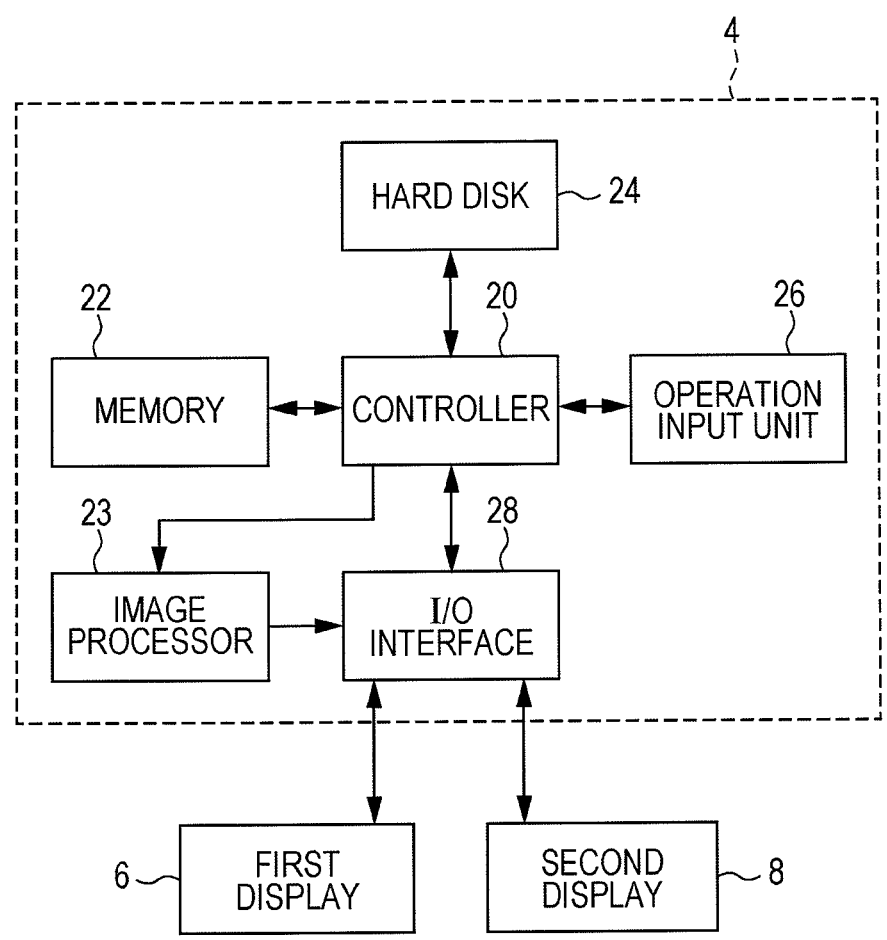
FIG. 2 is a diagram illustrating a configuration of an information processing apparatus according to an exemplary embodiment of the invention.

FIG. 2 is a diagram illustrating a configuration of the information processing apparatus 4 according to the exemplary embodiment of the invention. As illustrated in FIG. 2, the information processing apparatus 4 includes a controller 20, a memory 22, an image processor 23, a hard disk 24, an operation input unit 26, and an input/output (I/O) interface 28.

The controller 20 is a microprocessor, for example. The controller 20 executes information processing in accordance with a program stored in the memory 22.

The memory 22 is a random access memory (RAM), for example. The memory 22 stores, as the foregoing program, a conference control program (described below), a program of a document display application (described below), and a program of a handwritten edit application (described below). These programs may be read from a computer-readable information storage medium, such as a digital versatile disc (DVD, registered trademark)-read only memory (ROM), and may be stored in the memory 22. Alternatively, these programs may be supplied via a communication network, such as a network, and may be stored in the memory 22.

Also, the memory 22 stores various types of data necessary for information processing.

The image processor 23 includes a video RAM (VRAM), draws an image for the first screen 16 or an image for the second screen 18 on the VRAM in accordance with an instruction provided from the controller 20, and supplies a video signal to the first display 6 or the second display 8.

The hard disk 24 stores various types of data. In the exemplary embodiment, the hard disk 24 stores plural documents. Here, the hard disk 24 stores plural documents including documents X, Y, Z, and W. The document X is data having a data format X used in a document display application X, the document Y is data having a data format Y used in a document display application Y, the document Z is data having a data format Z used in a document display application Z, and the document W is data having a data format W used in a document display application W. Here, the document display application is a program for realizing a function of controlling display of a document. With the document display application, scaling up/down or scrolling of a displayed document, change of a display target page, etc., are performed in response to an operation related to the document.

Alternatively, the hard disk 24 may be provided outside the information processing apparatus 4. The hard disk 24 also stores data other than the documents (described below).

The operation input unit 26 includes a keyboard and mouse, for example.

The I/O interface 28 is an interface for transmitting data to/receiving data from the first display 6 and the second display 8. The I/O interface 28 outputs a video signal representing an image to be displayed on the first screen 16 to the first display 6, and outputs a video signal representing an image to be displayed on the second screen 18 to the second display 8. Also, the I/O interface 28 (status obtaining unit) receives information showing a position on the first screen 16 pressed by the user 10 or information showing the statuses of the respective electronic pens 14 (information) from the first display 6, and outputs the information to the controller 20. Also, the I/O interface 28 receives information showing a position on the second screen 18 pressed by the user 10 from the second display 8, and outputs the information to the controller 20.

Figure 3:
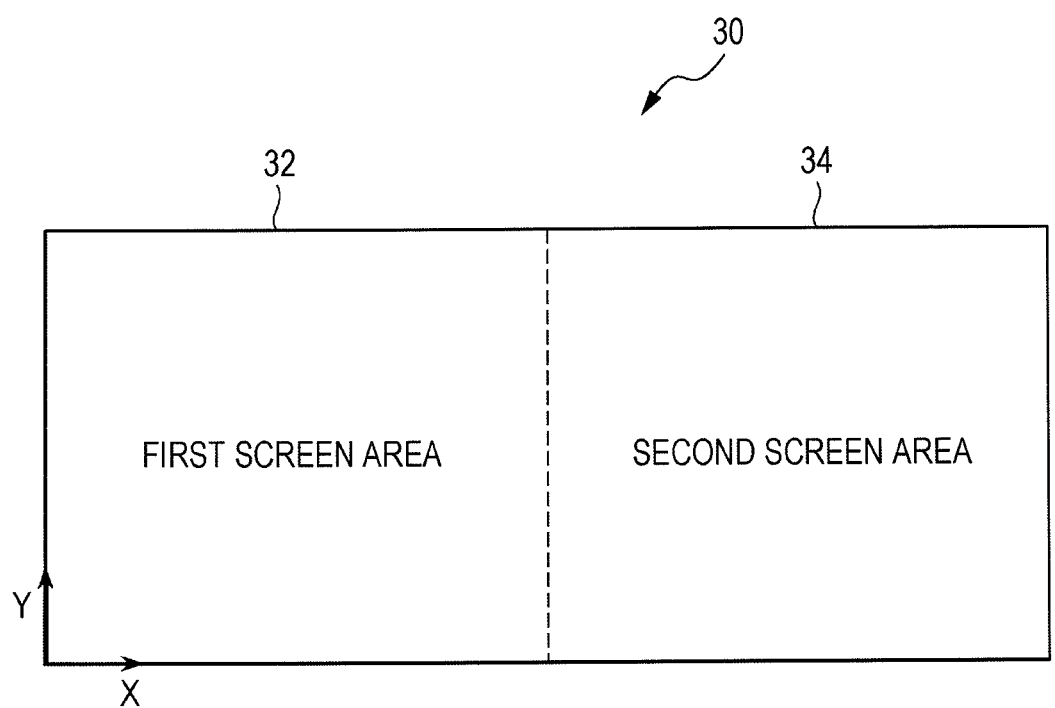
FIG. 3 is a diagram illustrating an example of a screen area.

In the information processing apparatus 4, a screen area 30 is internally set. FIG. 3 is a diagram illustrating an example of the screen area 30. As illustrated in FIG. 3, the screen area 30 includes a first screen area 32 and a second screen area 34. The first screen area 32 corresponds to the first screen 16, and the second screen area 34 corresponds to the second screen 18. The user 10 moves his/her finger on the first screen 16 or the second screen 18 while pressing the screen, thereby inputting a trail into the screen area 30.

Also, an X axis and a Y axis are set in the screen area 30. The controller 20 (trail obtaining unit) obtains a trail input by the user 10 on the basis of position information supplied from the first display 6 or the second display 8 in accordance with the conference control program. More specifically, the controller 20 obtains a position coordinate sequence representing the trail input by the user 10.

Figure 4A:
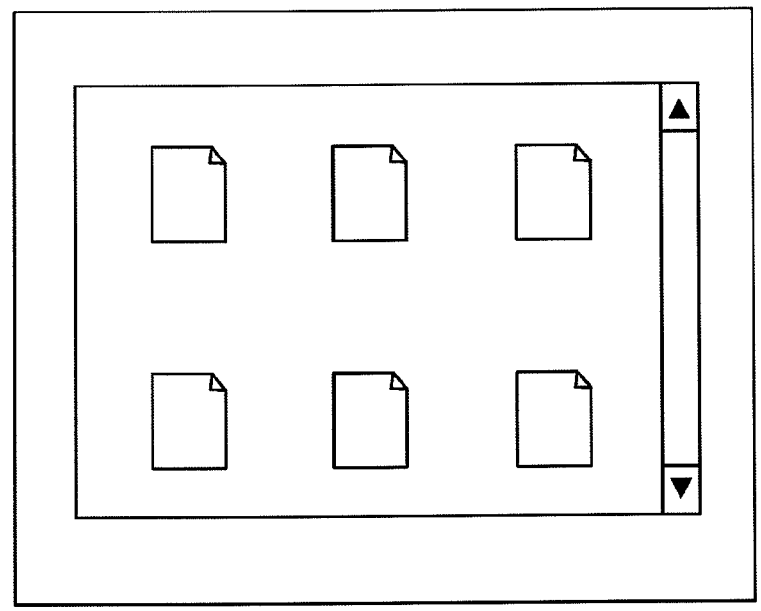
FIG. 4A is a diagram illustrating an example of a document list display screen.

In the conference system 2, the controller 20 causes the second screen 18 to display a document list display screen in accordance with the conference control program. The document list display screen is a screen used by the user 10 to select a document to be displayed on the first screen 16 from among the documents stored in the hard disk 24. FIG. 4A illustrates an example of the document list display screen. As illustrated in FIG. 4A, small images of respective documents are displayed on the document list display screen.

When the user 10 selects a small image to specify a desired document, the controller 20 starts the document display application corresponding to the specified document in accordance with the conference control program. Then, the controller 20 (first display controller) opens the specified document and causes the first screen 16 to display a document image of the document (first image) in accordance with the started document display application.

Figure 5:
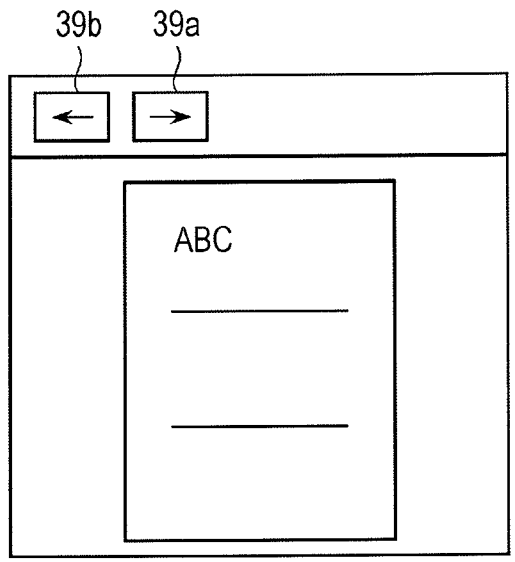
FIG. 5 is a diagram illustrating an example of a document image displayed on a first screen.

For example, if the user 10 selects the small image of the document X to specify the document X, the controller 20 starts the document display application X corresponding to the specified document X in accordance with the conference control program. Then, the controller 20 opens the document X and causes the first screen 16 to display a document image of the document X in accordance with the document display application X. For example, the document image of the first page is displayed on the first screen 16. FIG. 5 illustrates an example of the document image displayed on the first screen 16. More specifically, FIG. 5 illustrates an example of the document image of the first page displayed on the first screen 16. The buttons denoted by reference numerals 39*a* and 39*b* are first page turning buttons 39*a* and 39*b*. Hereinafter, the first page turning buttons 39*a* and 39*b* may be collectively referred to as first page turning buttons 39.

Figure 4B:
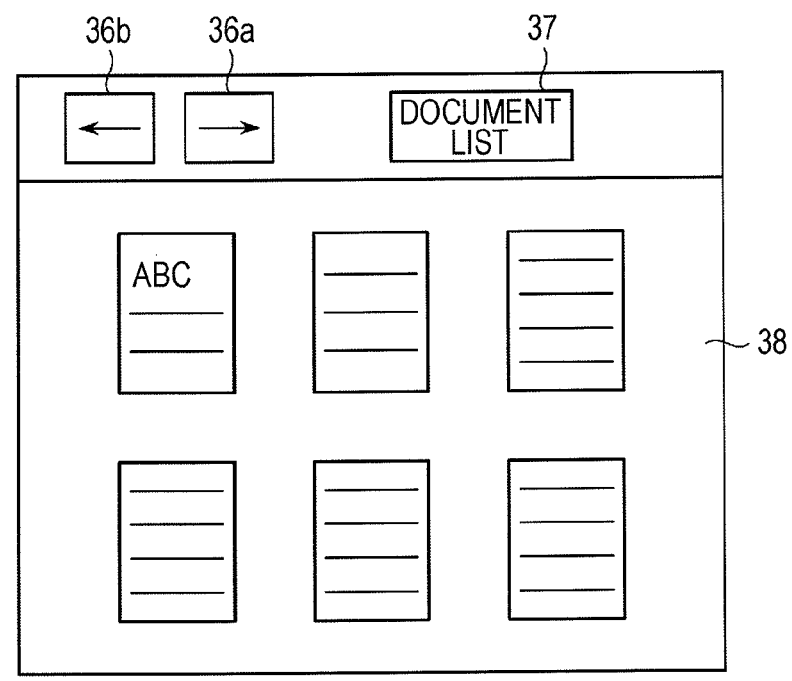
FIG. 4B is a diagram illustrating an example of a first screen control screen.

Upon a document being specified, the controller 20 not only starts a document display application but also causes the second screen 18 to display a first screen control screen in accordance with the conference control program. FIG. 4B is a diagram illustrating an example of the first screen control screen. As illustrated in FIG. 4B, a list of the small images of the documents that have been opened till the present time is displayed in a history display area 38 on the first screen control screen. Also, second page turning buttons 36*a* and 36*b* and a document list button 37 are displayed on the first screen control screen. Hereinafter, the second page turning buttons 36*a* and 36*b* may be collectively referred to as second page turning buttons 36.

In the conference system 2, the user 10 may select a document to be displayed on the first screen 16 also from among the documents that have been opened till the present time. That is, in a case where the user 10 selects one of the small images displayed in the history display area 38 to specify a document, the controller 20 starts the document display application corresponding to the specified document in accordance with the conference control program. Then, the controller 20 (first display controller) opens the specified document and causes the first screen 16 to display a document image of the document in accordance with the document display application. When the document list button 37 is pressed by the user 10, the foregoing document list display screen is displayed again on the second screen 18.

The purpose of the second page turning buttons 36 will be described below.

In the above-described manner, the user 10 specifies the document to be displayed on the first screen 16 on the document list display screen or the first screen control screen, thereby causing the document display application corresponding to the document to be started. After causing the document display application to be started, the user 10 starts a presentation.

Figure 6:
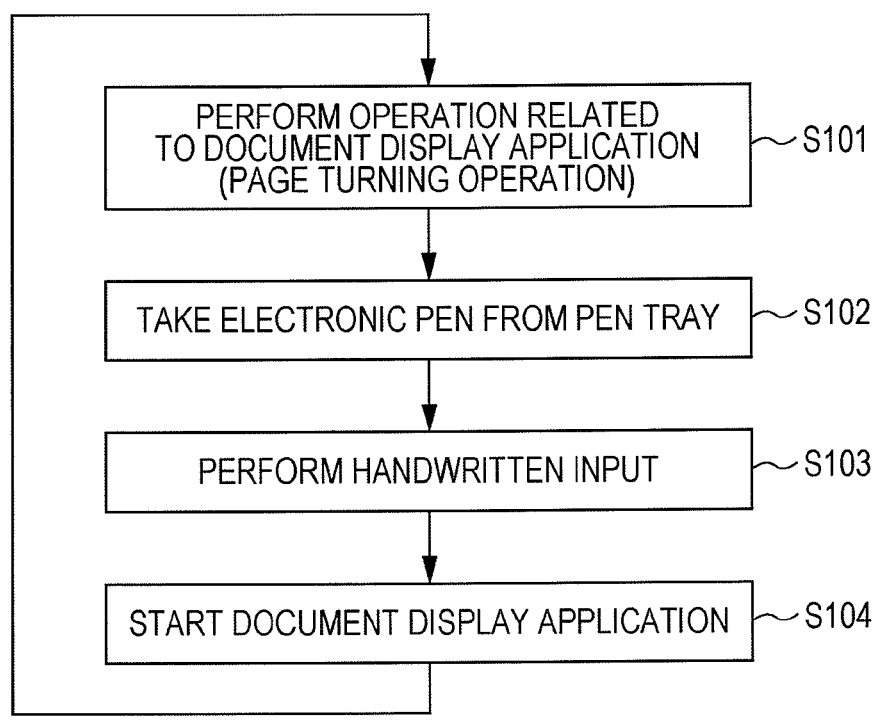
FIG. 6 is a diagram for explaining a method for using the conference system.

Hereinafter, a basic method for using the conference system 2 at the time when the user 10 performs a presentation will be described with reference to FIG. 6.

[Step S101]

In accordance with the progress of a conference, the user 10 inputs a trail and performs an operation related to a document display application. For example, the user 10 inputs a trail and performs a page turning operation, so as to provide an instruction to turn a page (step S101). Specifically, the user 10 performs a page turning operation by tracing the vicinity of any of the first page turning buttons 39 (see FIG. 5) on the first screen 16 with his/her finger to input a trail.

Figure 7:
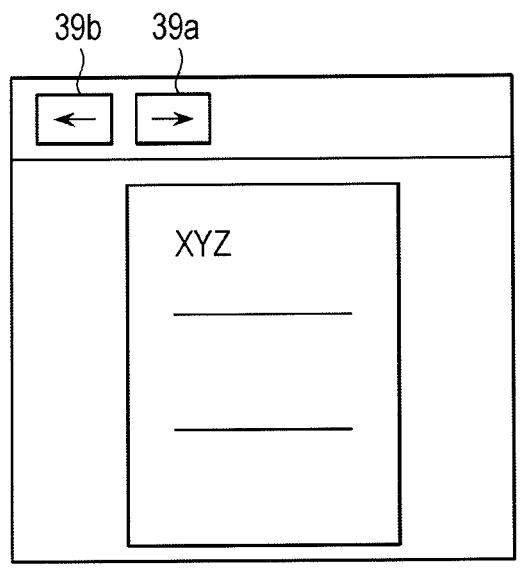
FIG. 7 is a diagram illustrating an example of a document image displayed on the first screen.

When the document display application is operating, the controller 20 (first update unit) updates the document image displayed on the first screen 16 on the basis of the position coordinate sequence of the input trail in accordance with the document display application. For example, if the page turning operation has been performed in the above-described manner, the controller 20 detects that the page turning operation has been performed on the basis of the input trail (specifically, the position coordinate sequence), and draws the document image of another page (e.g., the second page). FIG. 7 illustrates an example of the document image of the second page displayed on the first screen 16.

The page turning operation is not limited to the above-described operation, and varies depending on document display applications. For example, in the document display application Y, the user 10 performs a page turning operation by putting a finger tip on the first screen 16 and moving the finger tip in a horizontal direction. Also, in the document display application Z, for example, the user 10 performs a page turning operation by putting a finger tip on the first screen 16 and moving the finger tip in a vertical direction by a certain distance or more. Also, in the document display application W, for example, the user 10 performs an operation of moving a display range by putting a finger tip on the first screen 16 and quickly moving the finger tip in a desired direction. Also, in a web browser, which is one of document display applications, change of a page is performed by pressing a link or button on a web page displayed thereon.

[Step S102]

In accordance with the progress of the conference, the user 10 takes any of the electronic pens 14 from the pen tray 12 in order to add handwritten annotations to a document image. For example, the user 10 takes the black pen 14a from the pen tray 12 (step S102).

The controller 20 detects that any of the electronic pens 14 has been taken from the pen tray 12 on the basis of the information supplied from the first display 6, in accordance with the conference control program. That is, the controller 20 detects, on the basis of the information obtained from the first display 6, that the status has changed from the status where all the electronic pens 14 are accommodated in the pen tray 12 to the status where any of the electronic pens 14 is not accommodated in the pen tray 12. When detecting that any of the electronic pens 14 has been taken from the pen tray 12, the controller 20 captures the image displayed on the first screen 16 in accordance with the conference control program and starts a handwritten edit application. While the handwritten edit application is operating, the controller 20 (second display controller) does not cause the first screen 16 to display a document image in accordance with the document display application, but causes the first screen 16 to display a display target image (second image) based on a captured image in accordance with the handwritten edit application. That is, the application for controlling the content displayed on the first screen 16 is switched from the document display application to the handwritten edit application. Here, the captured image and the display target image are bitmap images. In this stage, the controller 20 causes the first screen 16 to display the captured image itself as the display target image.

[Step S103]

The user 10 who has taken the electronic pen 14 from the pen tray 12 adds handwritten annotations using the electronic pen 14. That is, the user 10 puts the head of the electronic pen 14 on the first screen 16 and moves it, thereby performing handwritten input (step S103).

Figure 8:
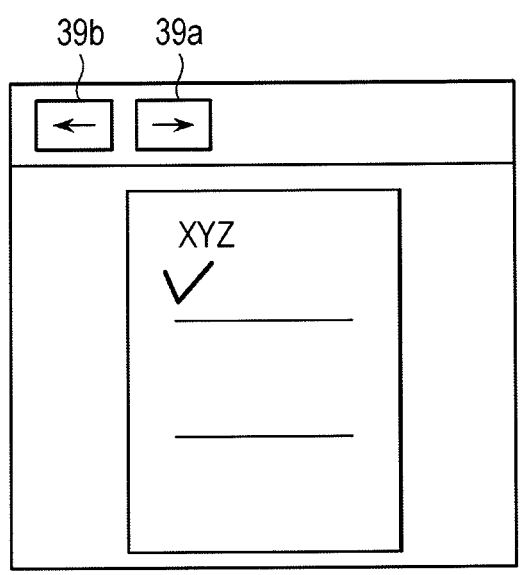
FIG. 8 is a diagram illustrating content displayed on the first screen.

When the handwritten edit application is operating, the controller 20 (second update unit) updates the display target image on the basis of an input trail in accordance with the handwritten edit application. That is, the controller 20 draws a trail image representing the input trail on the display target image. As a result, the trail image is displayed at the position pressed by the user 10 using the electronic pen 14. A black trail image is displayed when the black pen 14a is used, and a red trail image is displayed when the red pen 14b is used. FIG. 8 illustrates the content displayed on the first screen 16 at this time.

Figure 9:
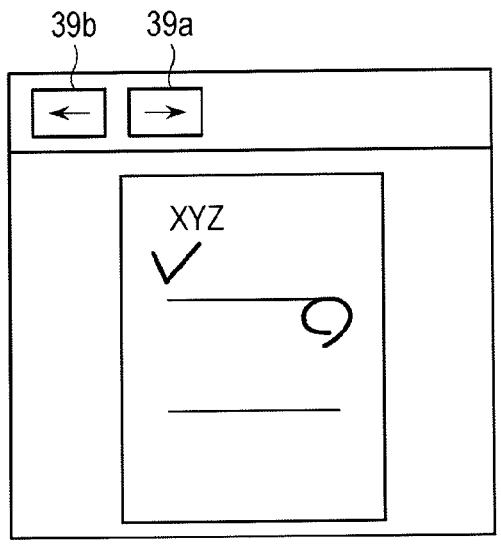
FIG. 9 is a diagram illustrating content displayed on the first screen.

When the user 10 wants to further add handwritten annotations, the user 10 inputs a trail at a desired position using the electronic pen 14. Then, a trail image representing the trail input this time is drawn, so that the trail image is displayed on the first screen 16. FIG. 9 illustrates the content displayed on the first screen 16 at this time.

If the handwritten annotations input this time are wrong, the user 10 performs an operation of erasing the wrong annotations (hereinafter referred to as an erasing operation). Specifically, the user 10 takes the eraser pen 14c from the pen tray 12 and rubs the vicinity of the trail image to be erased with the tip of the eraser pen 14c. In this case, the controller 20 (erasing unit) erases at least part of the trail image included in the display target image in accordance with the handwritten edit application. Accordingly, the portion of the trail image rubbed with the tip of the eraser pen 14c is erased from the first screen 16.

[Step S104]

After adding handwritten annotations to the second page, the user 10 starts the document display application in order to cause the first screen 16 to display another page or another document (step S104). Specifically, the user 10 performs an operation of pressing any of the second page turning buttons 36 (see FIG. 4B) displayed on the second screen 18 (given operation) or an operation of selecting the small image of another document displayed on the second screen 18 (given operation).

After any of the second page turning buttons 36 has been pressed or the small image of another document has been selected, the controller 20 stores a display target image in the hard disk 24 in accordance with the handwritten edit application. In this way, the display target image for reproducing the image of the document to which handwritten annotations have been added by the user 10 is stored. With the display target image stored in the hard disk 24, the image of the document to which handwritten annotations have been added by the user 10 is reproduced.

Then, the controller 20 (second switching controller) starts a document display application. Accordingly, the application for controlling the content displayed on the first screen 16 is switched from the handwritten edit application to the document display application. As a result, the controller 20 causes the first screen 16 to display the document image of another page or the document image of another document in accordance with the document display application.

As described above, the handwritten edit application starts when the status changes from the status where all the electronic pens 14 are accommodated in the pen tray 12 to the status where any of the electronic pens 14 is not accommodated in the pan tray 12. Thus, for example, if the user 10 performs a page turning operation in the next step S101 while holding any of the electronic pens 14, the user 10 needs to once accommodate the electronic pen 14 in the pen tray 12 and then take the electronic pen 14 from the pen tray 12 in order to start the handwritten edit application and add handwritten annotations. However, in the information processing apparatus 4, if the user 10 performs a page turning operation while holding the electronic pen 14, the handwritten edit application starts even if the user 10 inputs a trail onto the first screen 16 using the electronic pen 14 without once accommodating it in the pen tray 12. Hereinafter, this will be described.

Figure 10:
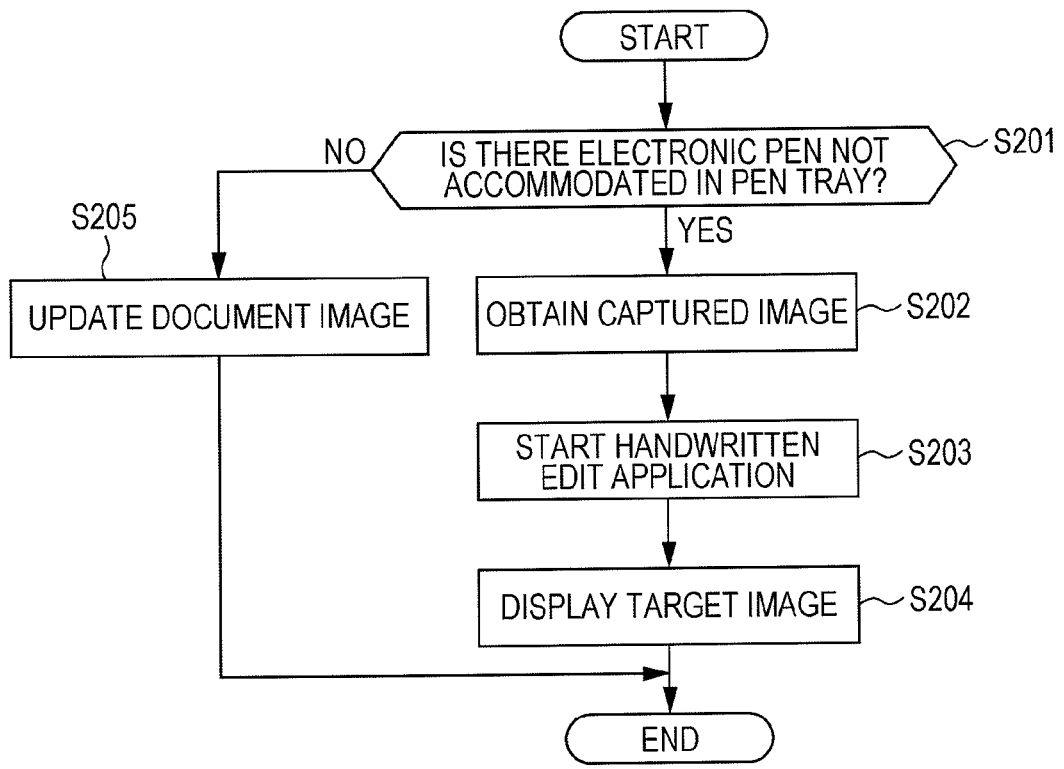
FIG. 10 is a flowchart illustrating an example of a process executed in the information processing apparatus.

FIG. 10 is a flowchart illustrating a process executed in the information processing apparatus 4. The process illustrated in FIG. 10 is executed in a case where the position coordinate sequence of a trail (hereinafter referred to as trail P) has been obtained when the document display application is operating.

First, the controller 20 determines, in accordance with the conference control program, whether the status shown by the information supplied from the first display 6 is a status where there is an electronic pen 14 that is not accommodated in the pen tray 12 (reference status) or not (step S201). In step S201, it is determined whether the user 10 has ever performed an operation related to the document display application (e.g., page turning operation) while holding the electronic pen 14 or not.

If all the electronic pens 14 are accommodated in the pen tray 12 (NO in step S201), it is determined that an operation related to the document display application (e.g., page turning operation) has been performed, and thus the controller 20 (first update unit) updates a document image (first image) in accordance with the document display application (step S205). For example, the controller 20 causes the first screen 16 to display the document image of the next page.

On the other hand, if there is an electronic pen 14 that is not accommodated in the pen tray 12 (YES in step S201), the controller 20 (image obtaining unit) captures the image displayed on the first screen 16, thereby obtaining the captured image, which a bitmap image (step S202).

Then, the controller 20 (first switching controller) starts the handwritten edit application (step S203). Then, the controller 20 (second display controller) generates a bitmap image, which is obtained by drawing a trail image representing a trail P on the captured image, in accordance with the handwritten edit application, and causes the first screen 16 to display the bitmap image as a display target image (step S204). For example, the color of the trail image is black when the black pen 14a is not accommodated in the pen tray 12, and the color of the trail image is red when the red pen 14b is not accommodated in the pen tray 12. In the exemplary embodiment, steps S202 to S204 are skipped if the eraser pen 14c is not accommodated in the pen tray 12.

As a result of the process illustrated in FIG. 10, in a case where the user 10 performs a page turning process while holding the electronic pen 14, the handwritten edit application starts even if the user 10 inputs a trail onto the first screen 16 using the electronic pen 14 without once accommodating it in the pen tray 12. Also, with the display target image stored in the hard disk 24, the image of the document to which handwritten annotations have been added by the user 10 is reproduced.

The exemplary embodiment of the invention is not limited to the above-described one.

For example, if there is an electronic pen 14 that is not accommodated in the pen tray 12 (YES in step S201), the controller 20 may execute step S301 (see FIG. 11 described below) for determining whether the user 10 has input a trail P in order to add handwritten annotations or not before executing step S202. Hereinafter, this exemplary embodiment will be described with reference to FIG. 11.

In this exemplary embodiment, if there is an electronic pen 14 that is not accommodated in the pen tray 12 (YES in step S201), the controller 20 proceeds to step S301. Then, in step S301, the controller 20 executes the process described below in accordance with the conference control program.

Figures 11, 12:
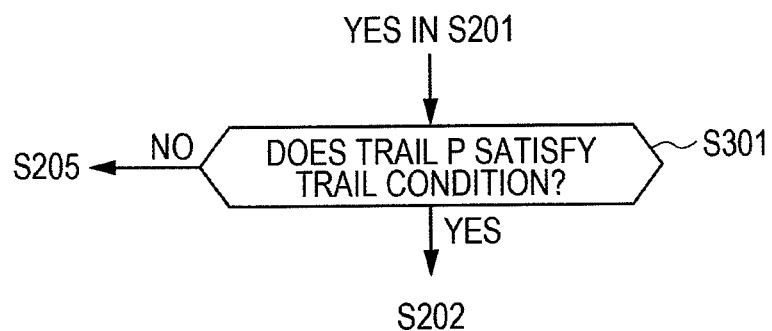
FIG. 11 is a flowchart illustrating an example of a process executed in the information processing apparatus.
FIG. 12 is a diagram illustrating an example of a condition table.

That is, the controller 20 first reads a condition table from the hard disk 24 (condition memory). FIG. 12 is a diagram illustrating the condition table. As illustrated in FIG. 12, in the condition table, a condition related to the data format of the currently opened document (document P in FIG. 12) is associated with a trail condition. As illustrated in FIG. 12, the trail condition changes in accordance with the data format of the currently opened document P.

A trail condition A is a condition related to the position (range) of a trail P and corresponds to the document display application X. When the trail P is in a preset range, the trail P satisfies the trail condition A.

A trail condition B corresponds to the document display application Y. As described above, in the document of the document display application Y, a page turning operation is performed by moving a finger tip in a horizontal direction, and thus the trail condition B is set as a condition related to the angle formed between at least part of the trail P and a reference line. For example, when the average of the angle formed between a straight line connecting two adjacent points of the trail P (position coordinate sequence) and the reference line (here, X axis) is a reference angle (e.g., five degrees) or more, the trail P satisfies the trail condition B.

A trail condition C corresponds to the document display application Z. As described above, in the document of the document display application Z, a page turning operation is performed by moving a finger tip in a vertical direction by a certain distance or more, and thus the trail condition C is set as a condition related to the length in the X axis (see FIG. 3) direction of the trail P. When the length in the X axis direction of the trail P is shorter than a reference value, the trail P satisfies the trail condition C.

A trail condition D corresponds to the document display application W. In the document of the document display application W, a page turning operation is performed by putting a finger tip on the first screen 16 and quickly moving the finger tip, and thus the trail condition D is set as a condition related to the input speed of the trail P. When the average of the distance between two adjacent points of the trail P (position coordinate sequence) is equal to or smaller than a reference value, the trail P satisfies the trail condition D. Since the trail condition D is set in this way, a case where the user 10 slowly inputs the trail P in order to draw a line under characters or the like is distinguished from a case where the user 10 quickly inputs the trail P in order to perform a page turning operation.

Hereinafter, the trail conditions A to D may be collectively referred to as "trail conditions".

After reading the condition table, the controller 20 determines whether the trail P satisfies the trail condition associated with the foregoing condition that the currently opened document satisfies or not in accordance with the conference control program. That is, the controller 20 determines whether the user 10 has input the trail P in order to add handwritten annotations or not.

If the trail P does not satisfy the trail condition (NO in step S301), the controller 20 proceeds to step S205. If the trail P satisfies the trail condition (YES in step S301), the controller 20 proceeds to step S202.

Note that, even if step S301 is performed, it may be determined that handwritten annotations have been added though the user 10 has not input the trail P in order to add handwritten annotations. In such a case, there may be a problem in the trail condition.

Then, after a trail satisfying a trail condition has been obtained when a document display application is operating, if the trail image representing the trail is erased by an erasing operation within a certain period, the controller 20 (condition update unit) may update the trail condition corresponding to the document display application. Hereinafter, this will be described.

In this case, the controller 20 not only executes step S301 but also associates the current time with the trail image of the trail P just after step S204 in accordance with the conference control program. Also, the controller 20 associates the identification information of the document display application that is operating before the handwritten edit application is started in step S203 with the trail image of the trail P. In this state, if the controller 20 erases at least part of the trail image of the trail P in accordance with the handwritten edit application, the controller 20 determines whether the elapsed time from the time associated with the trail image of the trail P is equal to or smaller than a certain value or not in accordance with the conference control program. If the elapsed time is equal to or smaller than the certain value, the controller 20 updates the trail condition corresponding to the document display application associated with the trail image of the trail P in accordance with the conference control program. Accordingly, the trail condition is strictly set.

According to the description given above, a page turning operation is performed by pressing any of the first page turning buttons 39 when the document display application is operating. Alternatively, the page turning operation may be performed by pressing any of the second page turning buttons 36. In that case, an instruction to turn a page (update a document image) is provided to the document display application by the conference control program. Here, the instruction to turn a page is provided through an application program interface (API) of the document display application. As a result, the controller 20 performs a page turning operation in accordance with the document display application. In addition, the second page turning buttons 36 are effective only when the document display application is compatible with a page turning operation through the API. For example, when the document display application is incompatible with a page turning operation through the API, the second page turning buttons 36 may be shaded so that the user 10 is informed of the incompatibleness.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first touch panel;
   a second touch panel which displays a third program;
   a trail obtaining unit that obtains a trail input onto the first touch panel by a user;
   a memory that stores a first program of a document display application, a second program of a handwritten edit application and a condition table, and the third program that displays a document list, receives a selection of a document which the user instructs to display on the first touch panel, and changes a target page of the document, wherein the document display application is a program for realizing a function of controlling display of a document, the function is scaling up and down or scrolling of the display of a document, changing a display target page, and wherein the handwritten edit application draws a trail image representing the trail input on a display target image, and wherein in the condition table, a trail condition is related to a respective data format of a document;
   a pen tray that accommodates at least one electronic pen and includes a sensor which detects whether the at least one electronic pen is accommodated in the pen tray; and
   a controller that, while the first program is being performed on the first touch panel, performs the second program of the handwritten edit application in response to the electronic pen not being accommodated in the pen tray, and the trail input satisfying the trail condition corresponding to a data format of a currently opened document by the first program; and
   wherein the controller keeps performing the function of the first program on the first touch panel, in response to either the electronic pen being accommodated in the pen tray, or the trail input not satisfying the trail condition corresponding to the data format of the currently opened document by the first program;
   wherein the controller, while the third program is being performed on the second touch panel, switches from the second program to the first program on the first touch panel in response to the trail input being input by the user.

2. The information processing apparatus according to claim 1, further comprising:
   an erasing unit that erases at least part of the trail image included in the display target image in response to an erasing operation being performed by a user while the display target image is displayed; and
   a condition update unit that updates the trail condition in the condition table in response to at least part of the trail image representing the trail satisfying the trail condition being erased within a certain period after the trail is obtained while the document is being displayed.

3. An information processing method comprising:
   obtaining a trail input by a user;
   storing a first program of a document display application, a second program of a handwritten edit application and a condition table, and a third program that displays a document list, receives a selection of a document which the user instructs to display on a first touch panel, and changes a target page of the document, wherein the document display application is a program for realizing a function of controlling display of a document, the function is scaling up and down or scrolling of the display of a document, changing a display target page, and wherein the handwritten edit application draws a trail image representing the trail input on a display target image, and wherein in the condition table, a trail condition is related to a respective data format of a document;

detecting whether the at least one electronic pen is accommodated in a pen tray; and performing, while the first program is being performed on the first touch panel, the second program of the handwritten edit application in response to the electronic pen not being accommodated in the pen tray, and the trail input satisfying the trail condition corresponding to a data format of a currently opened document by the first program; and keeping performing the function of the first program, in response to either the electronic pen being accommodated in the pen tray, or the trail input not satisfying the trail condition corresponding to the data format of the currently opened document by the first program;

switching from the second program to the first program on the first touch panel, while the third program is being performed on a second touch panel, in response to the trail input being input by the user.

4. A non-transitory computer readable medium storing a program causing a computer to execute a process, the process comprising:

obtaining a trail input by a user;

storing a first program of a document display application, a second program of a handwritten edit application and a condition table, and a third program that displays a document list, receives a selection of a document which the user instructs to display on a first touch panel, and changes a target page of the document, wherein the document display application is a program for realizing a function of controlling display of a document, the function is scaling up and down or scrolling of the display of a document, changing a display target page, and wherein the handwritten edit application draws a trail image representing the trail input on a display target image, and wherein in the condition table, a trail condition relates to a respective data format of a document;

detecting whether the at least one electronic pen is accommodated in a pen tray; and performing, while the first program is being performed on the first touch panel, the second program of the handwritten edit application in response to the electronic pen not being accommodated in the pen tray, and the trail input satisfying the trail condition corresponding to a data format of a currently opened document by the first program; and keeping performing the function of the first program, in response to either the electronic pen being accommodated in the pen tray, or the trail input not satisfying the trail condition corresponding to the data format of the currently opened document by the first program;

switching from the second program to the first program on the first touch panel, while the third program is being performed on a second touch panel, in response to the trail input being input by the user.

* * * * *